United States Patent
Le et al.

(10) Patent No.: US 11,789,856 B2
(45) Date of Patent: Oct. 17, 2023

(54) APPLICATION LAUNCH SUPPORT

(71) Applicant: Snap Inc., Santa Monica, CA (US)

(72) Inventors: Phong Le, Santa Monica, CA (US); Minshen Hao, Hawthorne, CA (US); Evan Chien Yi Chow, Orinda, CA (US); Zhengyi Liu, Cupertino, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/490,858

(22) Filed: Sep. 30, 2021

(65) Prior Publication Data

US 2023/0100468 A1    Mar. 30, 2023

(51) Int. Cl.
G06F 9/44 (2018.01)
G06F 11/36 (2006.01)
G06F 21/10 (2013.01)
G06F 11/14 (2006.01)

(52) U.S. Cl.
CPC ...... *G06F 11/3692* (2013.01); *G06F 11/1479* (2013.01); *G06F 11/3612* (2013.01); *G06F 11/3684* (2013.01); *G06F 21/10* (2013.01); *G06F 2221/0775* (2013.01)

(58) Field of Classification Search
CPC ............. G06F 11/3692; G06F 11/1479; G06F 11/3612; G06F 11/3684; G06F 21/10; G06F 2221/0775
See application file for complete search history.

(56) References Cited

U.S. PATENT DOCUMENTS

| | | | |
|---|---|---|---|
| 8,060,089 B1* | 11/2011 | Bhan | H04W 60/02 340/7.22 |
| 9,519,474 B2 | 12/2016 | Kurian et al. | |
| 10,339,034 B2 | 7/2019 | Armitage | |
| 10,496,392 B2 | 12/2019 | Shuvali et al. | |
| 10,609,063 B1 | 3/2020 | Oliphant et al. | |
| 2004/0181781 A1* | 9/2004 | Tohdo | G06F 11/3632 717/124 |
| 2005/0086246 A1* | 4/2005 | Wood | G06F 16/21 |
| 2014/0344804 A1* | 11/2014 | Ein-Gal | H04L 67/10 717/177 |
| 2015/0082280 A1* | 3/2015 | Betak | G06F 11/3688 717/124 |
| 2020/0403855 A1* | 12/2020 | Sarood | H04L 41/046 |

* cited by examiner

*Primary Examiner* — Hang Pan
(74) *Attorney, Agent, or Firm* — SCHWEGMAN LUNDBERG & WOESSNER, P.A.

(57) ABSTRACT

A method of software launch regression testing comprises monitoring an operational parameter of an existing application running on a plurality of client devices and determining a probability interval from the operational parameter of the existing application. A candidate update application is then launched to a subset of the plurality of client devices. The method then proceeds with monitoring a corresponding operational parameter of the candidate update version running on the subset of client devices, determining if the corresponding operational parameter of the candidate update version falls within the probability interval, and, based on the probability interval falling within the probability interval, providing a testing pass notification.

17 Claims, 9 Drawing Sheets

| METRIC DEFINITION | OVERALL HEALTH INDICATOR? | STABLE WITH TIME? | STABLE ACROSS PERSONA OR DEVICE? | OVERALL SUITABILITY |
|---|---|---|---|---|
| MSG SEND | REASONABLE - COVERS A SMALL PORTION OF PRODUCT BUT NOT OVERALL HEALTH | NO. LIKELY TO VARY WITH HOLIDAY, WEEKEND OR TIME OF DAY | NO. NEW FEATURES MAY INCREASE "CHATTER" | REASONABLE |
| RATIO OF MSG SEND (CLIENT) TO MSG SEND (SERVER) | REASONABLE. RECORDS CORRECTNESS OF SENDING FLOW BUT NOT OVERALL EXPERIENCE | YES | NO. AFFECTED BY NETWORK CONDITIONS | BETTER |
| RATIO OF MSG SEND SUCCESS (CLIENT) TO MSG VIEW (RECIPIENT) | YES. COVERS THE SENDING FLOW AND SOCIAL NATURE OF THE PRODUCT | YES. RATIO IS A GOOD NORMALIZER OF CHAT VOLUME | YES. SHOULD BE STABLE ACROSS PERSONA AND DEVICE. | BEST |

FIG. 5

APPLICATION LAUNCH SUPPORT

BACKGROUND

Regression testing of software is done when changes are made to an existing software application or when there is an update of related code with which the existing software application interacts, for example an operating system update. The goal of regression testing is to check that such changes do not affect the current features of the software application, that is, that the capabilities of the existing software application do not regress on launch of the updated version or when running with the new associated code. One method of performing regression testing is to re-run previous automated tests on the new code (or to re-run the previous automated tests on the old code running on the new operating system) and compare the automated test results for the new code versus the automated test results for the old code. One of the benefits of such regression testing is that the automated tests already exist, but a disadvantage is that the effectiveness of the automated tests depend on the ability of the people creating the tests to provide a comprehensive suite of tests.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 5 is a table showing various metrics and their suitability for use in the regression testing methods disclosed herein, in one example.

DETAILED DESCRIPTION

Figure 1:
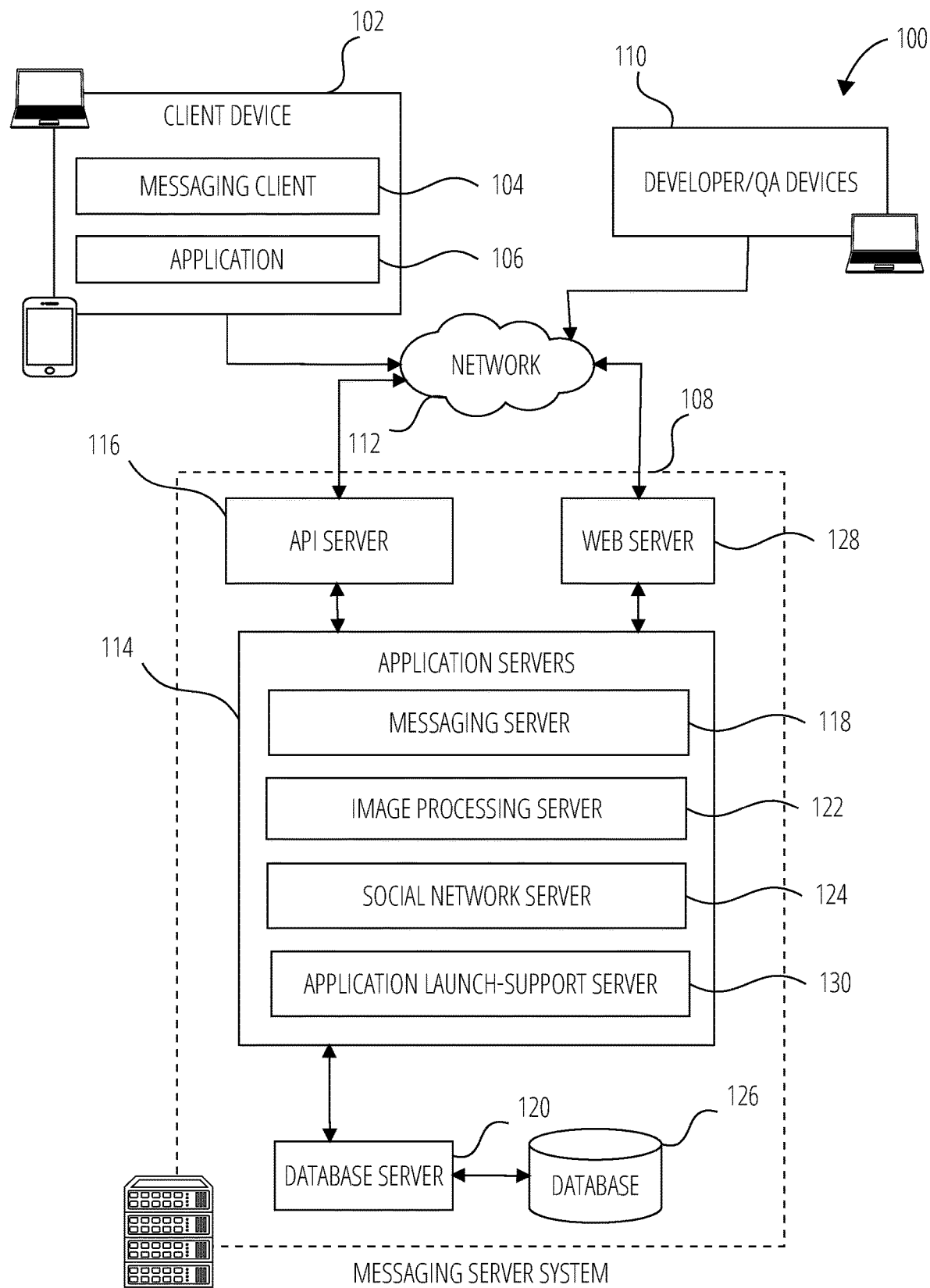
FIG. 1 is a diagrammatic representation of a networked environment in which the present disclosure may be deployed, in accordance with some examples.

In some examples, regression testing is performed by introducing a candidate update to a software application to a subset (for example 1%-30%) of the user-base of the existing software application (known as a "staging rollout"), to detect changes to user-engagement from previous releases. This method of regression testing is typically better than using "beta testers," as beta testers are self-selected (typically power users) and their use may not be predictive of how the entire user population will react to or interact with the new application version. This method of regression testing may also be superior to quality assurance engineers writing automated tests, as it is difficult to conceive of every edge case, or simulate the variability of users' environments (network connectivity, device performance, language-specific changes and so forth). Also, re-running previous automated tests does not account for user behavioral changes over time, which can bias the results achieved from such automated tests.

Though traditional regression testing works well at the micro level, even perfectly implemented software may have undesired side-effects when used in an intricate system, for example in a social network. To test for macro side effects, the methods described herein mimic an A/B test by observing changes to metrics between adopters of the change (i.e., users who update the app to the latest version during staging rollout) vs non-adopters, or by comparing before-and-after-adoption metrics for adopters. By observing changes to metrics such as Daily Active Users (DAU), Time Spent, content creation frequency, messaging frequency, and so forth, for the initial adopters, engagement can be determined to be "normal," which can signal full rollout of the update. Alternatively, the rollout of the update may be aborted in the case of abnormal engagement.

In one example, a method of software launch regression testing, performed by one or more processors, includes capturing an operational parameter of an existing application running on a plurality of client devices, determining a probability interval from the operational parameter of the existing application, launching a candidate update application to a subset of the plurality of client devices, monitoring a corresponding operational parameter of the candidate update application running on the subset of the plurality of client devices, determining if the corresponding operational parameter of the candidate update application falls within the probability interval, and based on the corresponding operational parameter falling within the probability interval, providing a testing pass notification.

The size of the probability interval may depend on whether or not the operation parameter is a critical parameter. The probability interval may comprise a confidence interval within which correct functioning of the candidate update application can be assumed, and the method may further include determining a prediction interval from the operational parameter of the existing application, the prediction interval comprising an interval of the operational parameter within which the candidate update application may or may not be functioning correctly, determining if the corresponding operational parameter of the candidate update application falls within the prediction interval, and based on the corresponding operational parameter falling outside the confidence interval but within the prediction interval, providing a testing review notification. Based on the corresponding operational parameter falling outside the prediction interval, a testing fail notification may be provided.

Launching of the candidate update application may include uploading the candidate update application to an app store, where a number of available downloads of the candidate update application from the app store is limited to a predetermined number. Launching of the candidate update application may also include limiting launch of the candidate update application to client devices having a particular characteristic. The particular characteristic may be location of the client devices within a particular geographical area or time zone.

In one example, the operational parameter is a ratio of transmissions of content from the subset of the plurality of client devices to successful viewing of the content on recipient client devices.

In another example, provided is a non-transitory computer-readable storage medium, the computer-readable storage medium including instructions that when executed by a computer, cause the computer to perform operations for software launch regression testing, including but not limited to the methods described above. For example, the operations may comprise capturing an operational parameter of an existing application running on a plurality of client devices, determining a probability interval from the operational parameter of the existing application, launching a candidate update application to a subset of the plurality of client devices, monitoring a corresponding operational parameter of the candidate update application running on the subset of the plurality of client devices, determining if the corresponding operational parameter of the candidate update application falls within the probability interval, and based on the corresponding operational parameter falling within the probability interval, providing a testing pass notification.

Other technical features may be readily apparent to one skilled in the art from the following figures, descriptions, and claims.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. For the purpose of illustrating the regression testing methods by way of example, the methods are described herein with reference to an update of the software comprising the messaging client 104, or an update to the operating system of the client device 102 on which the 104 runs.

Each messaging client 104 is communicatively coupled to other instances of the messaging client 104 (e.g., hosted on respective other client devices 102) and a messaging server system 108 via a network 112 (e.g., the Internet). A messaging client 104 can also communicate with locally-hosted applications 106 using Application Program Interfaces (APIs). The messaging system 100 also includes one or more developer/QA devices 110, which are communicatively coupled to the messaging server system 108 via the network 112. The developer/QA devices 110 provide a means whereby software engineers or software release personnel can administer the partial release of updated software for the messaging client 104 or another application 106.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. To this end, the social network server 124 maintains and accesses an entity graph within the database 126. Examples of functions and services supported by the social network server 124 include the identification of other users of the messaging system 100 with which a particular user has relationships or is "following," and also the identification of other entities and interests of a particular user.

The messaging client 104 can notify a user of the client device 102, or other users related to such a user (e.g., "friends"), of activity taking place in one or more external resources, for example games or slimmed down versions of third party applications. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging system 100 in the illustrated example includes an application launch-support server 130 as part of messaging server system 108, although application launch-support server 130 may alternative be provided as part of a separate software development or software release server system. The application launch-support server 130 receives and stores candidate update software for the messaging client 104 (or other applications) from one or more developer/QA devices 110. The application launch-support server 130 then uploads the candidate update software to a limited set of client devices 102 or to an app store with a limitation on the number of possible downloads from the app store. The application launch-support server 130 then monitors the user engagement with the messaging client 104 before and after the deployment of the candidate update software, and determines whether the user engagement is or isn't within parameters indicating that it is a candidate for a full release of the candidate update software as a final software update. Depending on the particular determinations, appropriate reports, messages or other notifications are provided by the application launch-support server 130 to the developer/QA devices 110. The methods implemented by the application launch-support server 130 are described in more detail below.

System Architecture

Figure 2:
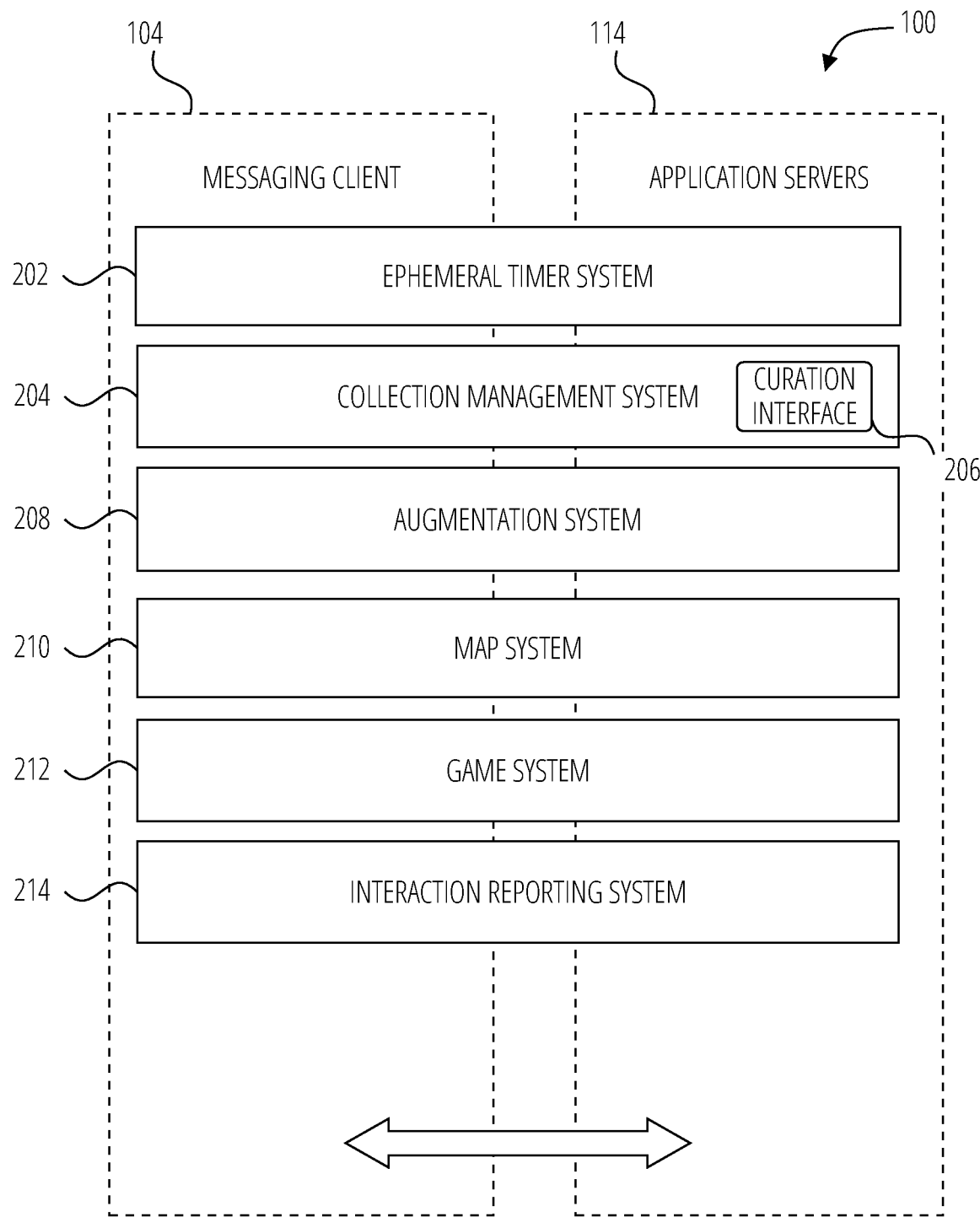
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, and an interaction reporting system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

The map system 210 provides various geographic location functions, and supports the presentation of map-based media content and messages by the messaging client 104. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The interaction reporting system 214 provides tracking and reporting of user interactions with the messaging client 104. In most cases this occurs inherently during the operation of the messaging client 104 as part of its functioning. This data collection and reporting may be to permit relevant commands to be executed by the messaging client 104 or the application servers 114. Additionally, user interactions and related engagement metrics may already be being observed or determined in the ordinary course of operation for reasons other than regression testing, such as to verify correct functioning, to log exposure to commercial messages or pay for content or for referrals, to update social network entity and relationship graphs, and so forth. The data collection required for operation of a system such as messaging system 100 or other social networking system provides the further benefit that metrics of existing messaging clients 104 are available and can be analyzed before the launch of any candidate update software, without requiring additional modifications to the messaging client 104 to do so.

Figure 3:
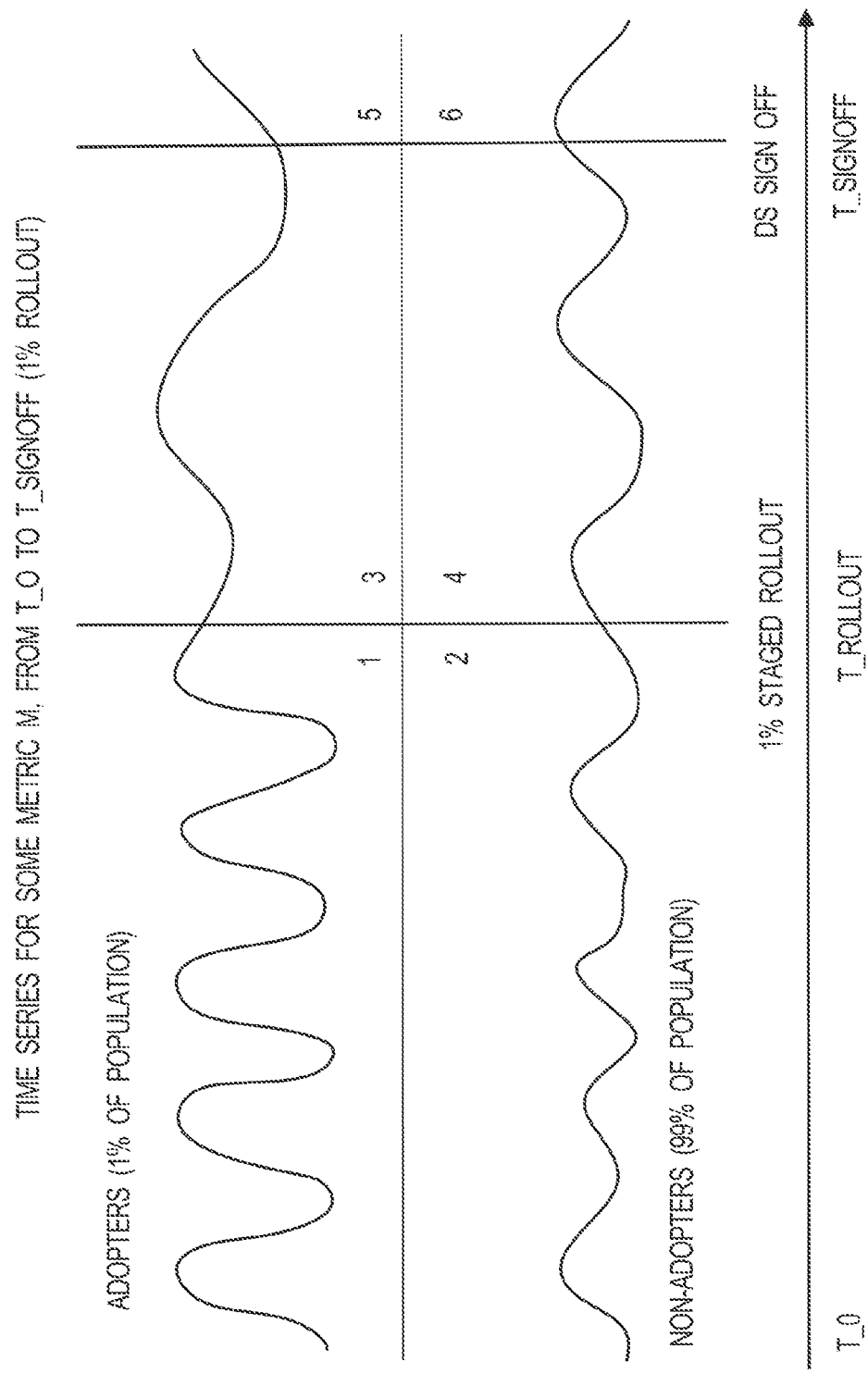
FIG. 3 is a graph showing a hypothetical metric (M) depicted over time for candidate software update adopters and non-adopters, before and after partial launch of the candidate software update, in one example.

FIG. 3 is a graph showing a hypothetical metric (M) depicted over time for candidate software update adopters and non-adopters, before and after partial launch of the candidate software update. The x-axis is time, starting at some initial time t(0) and ending at t(signoff), with launch of the candidate software update to the adopters' client devices 102 occurring at t(rollout). Two rows are shown—the upper row shows a plot of the metric M over time for adopters' client devices 102 and the lower row shows a plot of the metric M over time for non-adopters' client devices 102. In one example, the non-adopters are 99% of the user population of the messaging client 104 while the adopters are 1% of the user population. Initially, from time t(0) to time t(rollout) neither the adopters nor the non-adopters' client devices 102 have the new version yet, indicated by quadrants 1 and 2. Note that due to the small sample size, the variation of the metric M for non-adopters likely will not match the variation of M for adopters, despite both groups using the same version of the software on their client devices 102. At a minimum, the variability of M is likely to be greater for the smaller user sample size, as illustrated.

The candidate software update is then released out at time t(rollout). The candidate software update is released to the adopters' client devices 102 only, whose postlaunch data for M is indicated by quadrant 3. Meanwhile, M proceeds as usual for the non-adopters, indicated by quadrant 4.

It is then determined whether or not the variation in M in quadrant 3 for the adopters' client devices 102 is what is expected. This is done by comparing M in quadrant 3 with a baseline for what is normal and determining whether any variation from the baseline is beyond expectations. If the variation is beyond expectations, further analysis and remediation is performed on the candidate software update and the process is repeated until any variation in M is within expectations. At time t(signoff) after final approval, the candidate software update (now an actual software update) is released to the non-adopters' client devices 102 as well and the entire population has the software update.

Determining a proper baseline for what is normal has a number of challenges, since there are many factors other than a problem with the candidate software update itself that can affect the variation of M after t(rollout). For example, causal effects. Adopter user engagement with an existing application feature might be affected by unrelated system crashes or data losses, or because users' attention has been drawn away from an existing application feature by a new application feature that is included in the candidate software update. Additionally, there may be unrelated temporal bias. If a candidate software update is released late on a Friday night, Saturday morning user engagement may be different from weekday morning user engagement due to different life habits and not because of a problem with the candidate software update.

Furthermore, there may be an unrelated change in user behavior, for example in response to negative or positive publicity, or the launch of a competing product. Additionally, there may be a change in the baseline user behavior, for example if the candidate software update fixes a bug in the existing software, resulting in improved functionality. Finally, the receipt of metric data may be delayed for some reason.

One example of determining whether or not M is normal after release of the candidate software update is to compare absolute values of the behavior of the metric across a number of releases. If, for the most recent time interval, the metric value or metric behavior for the new version falls within a range of values or behaviors for past releases, it is deemed normal. This method may be improved by using the pre-launch metric value as well. In one example, a (post-pre) regression is determined over the past release values, to provide confidence and prediction intervals for the value of the metric post release.

Figure 4:
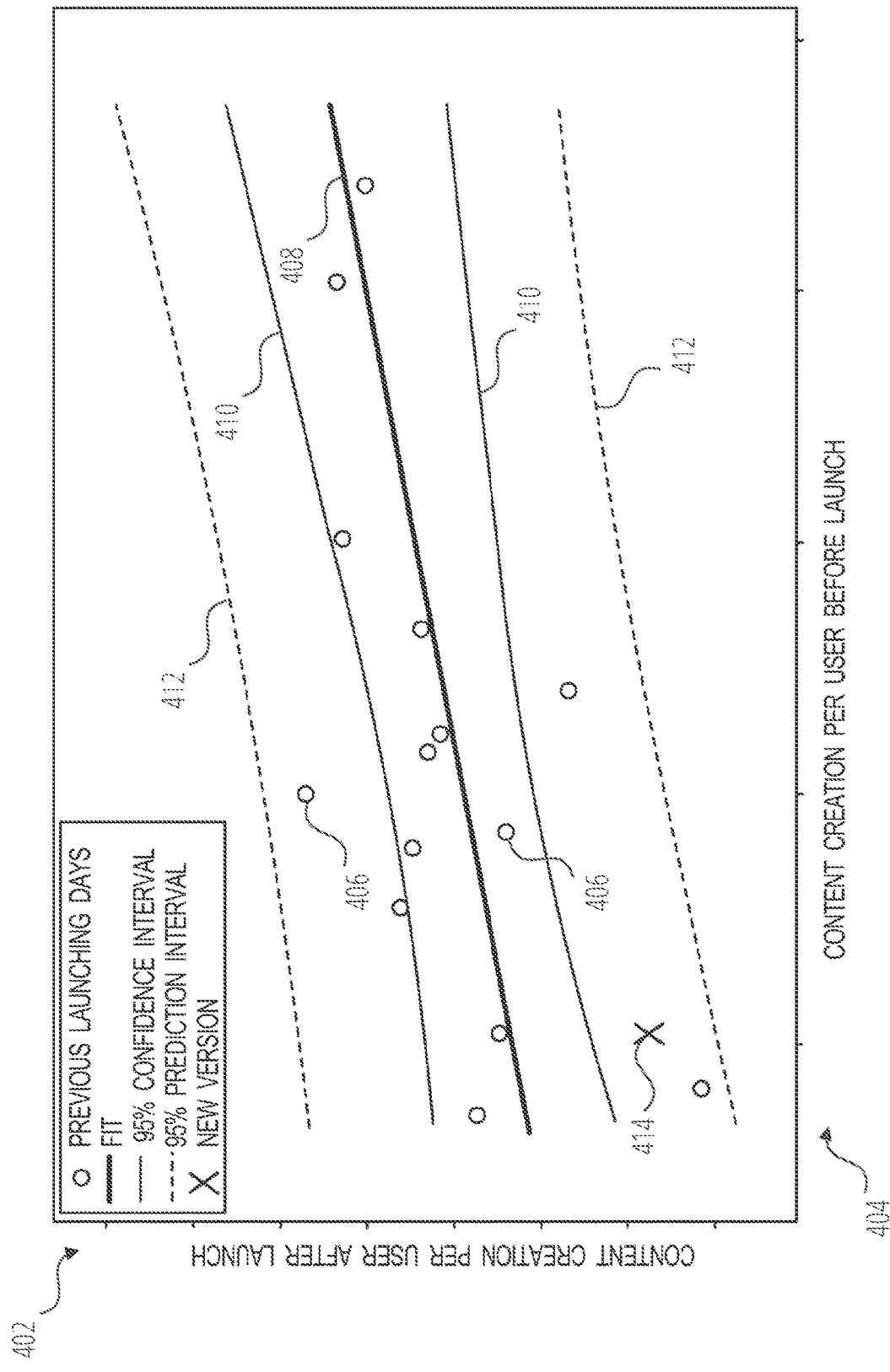
FIG. 4 is a graph of a content creation metric before and after partial launch of candidate software update, and associated intervals determined therefrom, in one example.

FIG. 4 is a graph that shows a content creation metric before and after partial launch of previous software updates, and associated intervals determined therefrom. The x-axis 404 of the graph shows the number of items of content created per user before launch of a software update. The y-axis 402 shows the same content creation metric after the launch of a software update.

Past launch data points 406 are illustrated by circles. These represent data for all users for past software updates, both adopters and proposed non-adopters for the candidate software update. From these data points, a fitted curve 408 can be determined, as well as a confidence interval 410 and a prediction interval 412. The confidence interval 410 and the prediction interval 412 are determined by performing a regression analysis on post-launch and pre-launch metric values from previous software update releases, i.e. on the past launch data points 406.

The prediction interval 412 in this example represents an interval within which, with 95% confidence, new release data points are likely to fall if there are no errors in the candidate software update. The confidence interval 410 in this example represents an interval within which, with 95% confidence, new release data points are likely to fall if there are probably no errors in the candidate software update. Also illustrated is an example of a current launch data point 414, which is generated from pre-launch and post-launch use of the candidate software update by adopters. Example current launch data point 414 is shown as falling outside confidence interval 410 but within prediction interval 412. In the case of such launch data points, which fall outside confidence interval 410 but within prediction interval 412, there may or may not be errors in the candidate software update, but it cannot be determined with reasonable certainty either way.

The confidence interval 410 and prediction interval 412 can be used in different ways depending on the implementation. In one example, metrics are assigned tiers based on how critical they are deemed to be. Since confidence intervals are narrower than prediction intervals (which result in more sensitive checks), confidence intervals are used to flag anomalies for metrics that are more critical while prediction intervals are used for metrics that are less critical.

In another example, a metric is assessed against both a confidence interval and a prediction interval. In such a case, there are three possible outcomes for a current launch data point 414. If it falls within the 95% confidence interval 410, the candidate software update is deemed to have passed regression testing for this metric. If it is outside the confidence interval 410 but within the looser prediction interval 412, then it is flagged for further analysis to determine if there may be unrelated factors (temporal biases, etc.) that are causing the current launch data point 414 to fall outside the confidence interval 410. If an unrelated factor is determined to be responsible or likely to be responsible, the candidate software update is deemed to have passed regression testing for this metric. Finally, if the current launch data point 414 is outside the prediction interval 412, then the candidate software update has failed the regression testing and a full launch of the candidate software update is held or aborted until the problem is resolved. By using a regression confidence interval instead of a strict range check, there is a better chance that cases that might be outside a strict range but that may actually be normal are identified as such.

The confidence interval 410 and the prediction interval 412 may also be appropriately wider or tighter based on the density of (release) data points nearby. This can be seen in FIG. 4, where both the confidence interval 410 (more prominently) and the prediction interval 412 pinch inward towards the center of the graph. With more accurate boundaries, this reduces the likelihood of both false positives and false negatives occurring.

Confidence and prediction intervals and determining same from available data are known in the field of statistical hypothesis testing.

The nature of the metric M that is monitored also affects the performance of the regression testing system. Preferably, the metric M is a sensitive indicator for the overall health of the product but is less sensitive to factors that might affect the metric without indicating a problem with the candidate software update. That it, preferably it is stable over time and does not change markedly over weekdays, weekend days, public holidays, time of day and so forth. Also it is preferably stable if the user persona or device class composition changes. For example, not a performance metric that varies if the candidate software update is loaded onto a more high or low powered device.

FIG. 5 is a table showing various metrics and their suitability for use in the regression testing methods disclosed herein. The first column of the table identifies the metric, the second column shows whether the metric is a good overall health indicator, the third column shows whether the metric is stable with time, the third column shows whether the metric is stable across a mix of user personas or device classes, and the final column shows the overall suitability. In each case, the suitability of the metric for use in a "before launch" vs. "after launch" comparison of the candidate software update is being considered.

As can be seen, three metrics in rows two to four are evaluated in FIG. 5. The first metric "Message Send" is a count of user messages sent from a user's client device 102. The second metric is a ratio of "Message Send" from the user's client device 102 to "Message Send" from the messaging server 118. The third metric is a ratio of "Message Send Success" from the user's client device 102 to "Message View" at the recipients client device 102.

The "Message Send' metric is a reasonable indicator of overall health but covers only a small portion of the overall functionality of messaging system 100 and is not truly representative of overall health. It is also not stable with time, since the volume of messages is likely to vary significantly depending on the time and type of day. Similarly, it is not particularly stable across different personas or different device classes, since new features may create additional appeal or have a novelty factor, and new features may appeal to new or different groups of people, with a resultant fluctuation in chatter.

The ratio of "Message Send" from the user's client device 102 to "Message Send" from the messaging server 118 is a reasonable indicator of overall health of the messaging system 100, since it reflects correct message flow, but does not measure the overall user experience. Or, stated differently, this ratio will not give a consistent value if the user experience is affected by intentional changes that function correctly but that make the user experience better or worse as such. This metric is however likely to be stable with time. As a ratio, it should be consistent across different times and types of day. However, it may not be stable across different personas or device types, since network conditions may affect the ratio.

The third metric is a ratio of "Message Send Success" from the user's client device 102 to "Message View" at the recipients client device 102. This metric is a good indicator of overall health of the messaging system 100 since it captures message flow from sender initiation to viewing by the recipient, and also reflects the social nature of the overall messaging system 100 product. This metric is also likely to be stable with time. As a ratio, it should be consistent across different times and types of day. It is also likely to be stable across different personas or device types.

Figure 6:
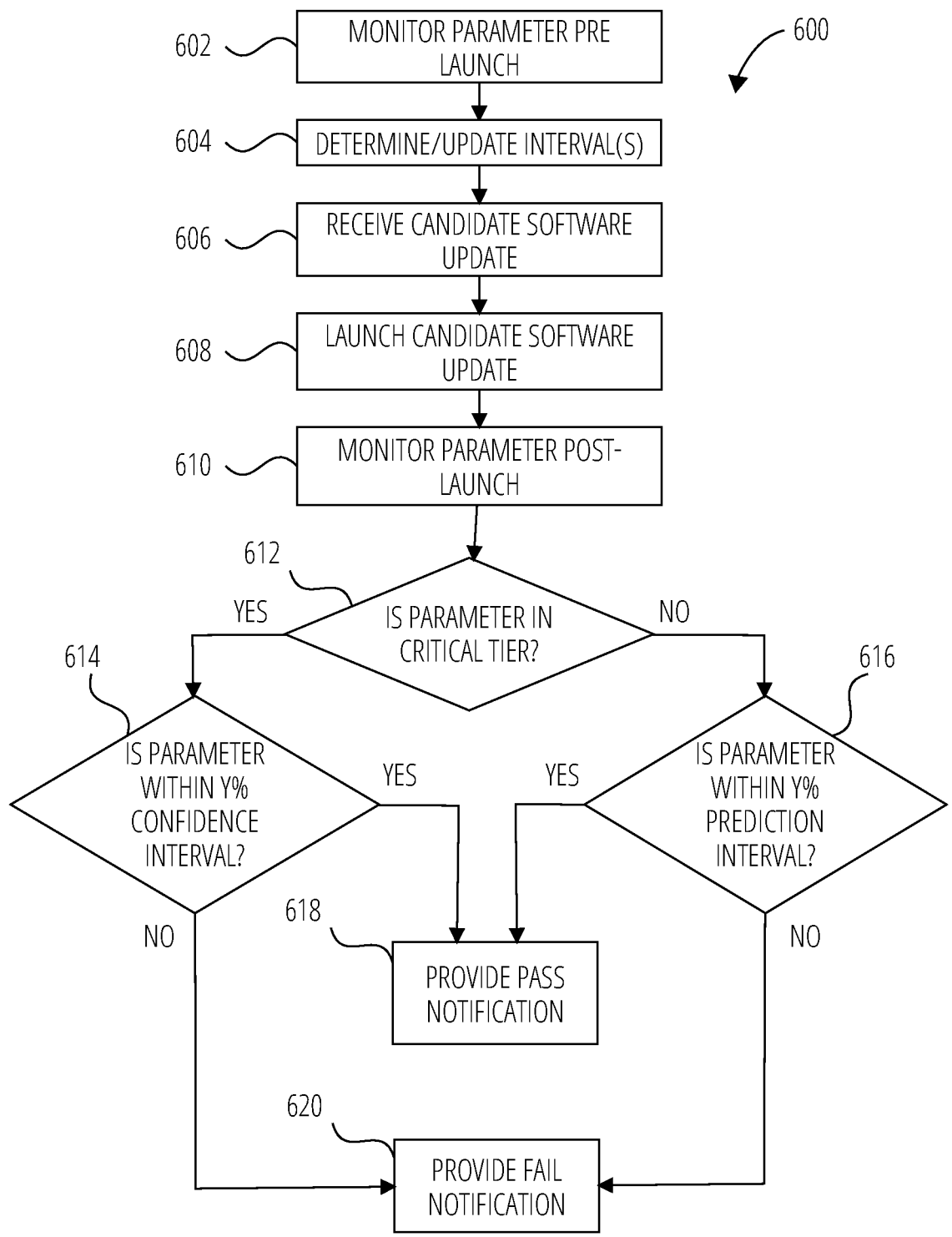
FIG. 6 is a flowchart 600 illustrating a regression testing method according to one example.

FIG. 6 is a flowchart 600 illustrating a regression testing method according to one example. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations. Furthermore, while the operations in flowchart 600 are described with reference to application launch-support server 130, the associated functionality may alternative be provided as part of a separate software development or software release server system or separated between different servers or devices, including client devices 102.

The flowchart commences with the application launch-support server 130 monitoring one or more operational parameters pre-launch at operation 602. This monitoring may be of the relevant parameter(s) on all of the client devices 102 of current users of the messaging client 104 or only those of the intended recipients of the candidate update software if those can be specified in advance of the launch. Alternatively, the pre-launch parameters could be extracted after launch from the pre-launch data for the general population, once the client devices 102 that receive the candidate software update have been identified. The parameters could be user engagement parameters, system parameters or any other operational parameter that can be used to assess the functioning of the candidate update software itself, in the messaging system 100, or with other systems.

In operation 604, either one or both of the confidence interval 410 and the prediction interval 412 are determined by the application launch-support server 130 from the pre-launch parameter data, as discussed above with reference to FIG. 3 and FIG. 4. In the example of FIG. 6, a parameter is tested against either a confidence interval or a prediction interval depending on whether or not the parameter has been assigned to a critical tier. As discussed above, confidence intervals are used to flag anomalies for metrics that have been assigned to a critical tier while prediction intervals are used for metrics that have been assigned to a less critical tier. Accordingly, it is only necessary to determine the relevant interval (confidence or prediction) in operation 604 based on whether or not the parameter is or isn't in the critical tier.

The application launch-support server 130 then receives the candidate software from one or more developer/QA devices 110 in operation 606 and stores it in advance of launch of the update.

The application launch-support server 130 then launches the candidate software update in operation 608. In one example, the candidate software update is uploaded to an app store as an update to the messaging client 104 with the number of available downloads limited to a specific number of client devices 102. In another example, the candidate software update can be pushed to the desired number of client devices 102, which are preferably chosen randomly or semi-randomly, for example randomly (as far as practical) within a particular geographical area, time zone, operating system or other system or device parameter that may assist in eliminating a factor that could affect the relevant parameter(s) that is/are to be monitored for the regression testing.

The application launch-support server 130 then monitors the parameter(s) reflecting the user engagement with the updated messaging client 104 on the client device 102 in operation 610, and, if necessary, determines secondary parameters such as ratios and so forth that characterize the user experience, engagement or functioning of the updated messaging client as part of the messaging system 100.

Operation 602 and operation 604 may be based on a certain time. In one example, user engagement parameters may be monitored for three hours before launch of the update, the candidate software update may be provided to 700,000 client devices 102 (in a population of millions of users) and the engagement parameters may be monitored on the updated messaging client 104 for five hours after the update has been launched. These numbers may vary based on any number of considerations, such as the overall size of the user population and how active each user is on average.

As illustrated by decision block 612, at the end of the monitoring period, the application launch-support server 130 tests whether or not whether an observed parameter for the adopters of the candidate software update is either within the confidence interval or the prediction interval depending on whether or not the observed parameter is in the critical tier.

If the parameter is in the critical tier, at operation 614 it is determined whether or not the parameter is within an X % (95% in one example) confidence interval. If it is, the application launch-support server 130 provides a corresponding notification in operation 618, for example to the developer/QA devices 110 or to a dashboard that the candidate software update has passed regression testing for this parameter. If it is not, the method proceeds to operation 620 where the application launch-support server 130 provides a corresponding notification, for example to the developer/QA devices 110 or to a dashboard that the candidate software update has failed regression testing for this parameter.

If the parameter is not in the critical tier, at operation 616 it is determined whether or not the parameter is within an X % (95% in one example) prediction interval. If it is, the application launch-support server 130 provides a corresponding notification in operation 618, for example to the developer/QA devices 110 or to a dashboard that the candidate software update has passed regression testing for this parameter. If it is not, the method proceeds to operation 620 where the application launch-support server 130 provides a corresponding notification, for example to the developer/QA devices 110 or to a dashboard that the candidate software update has failed regression testing for this parameter.

Figure 7:
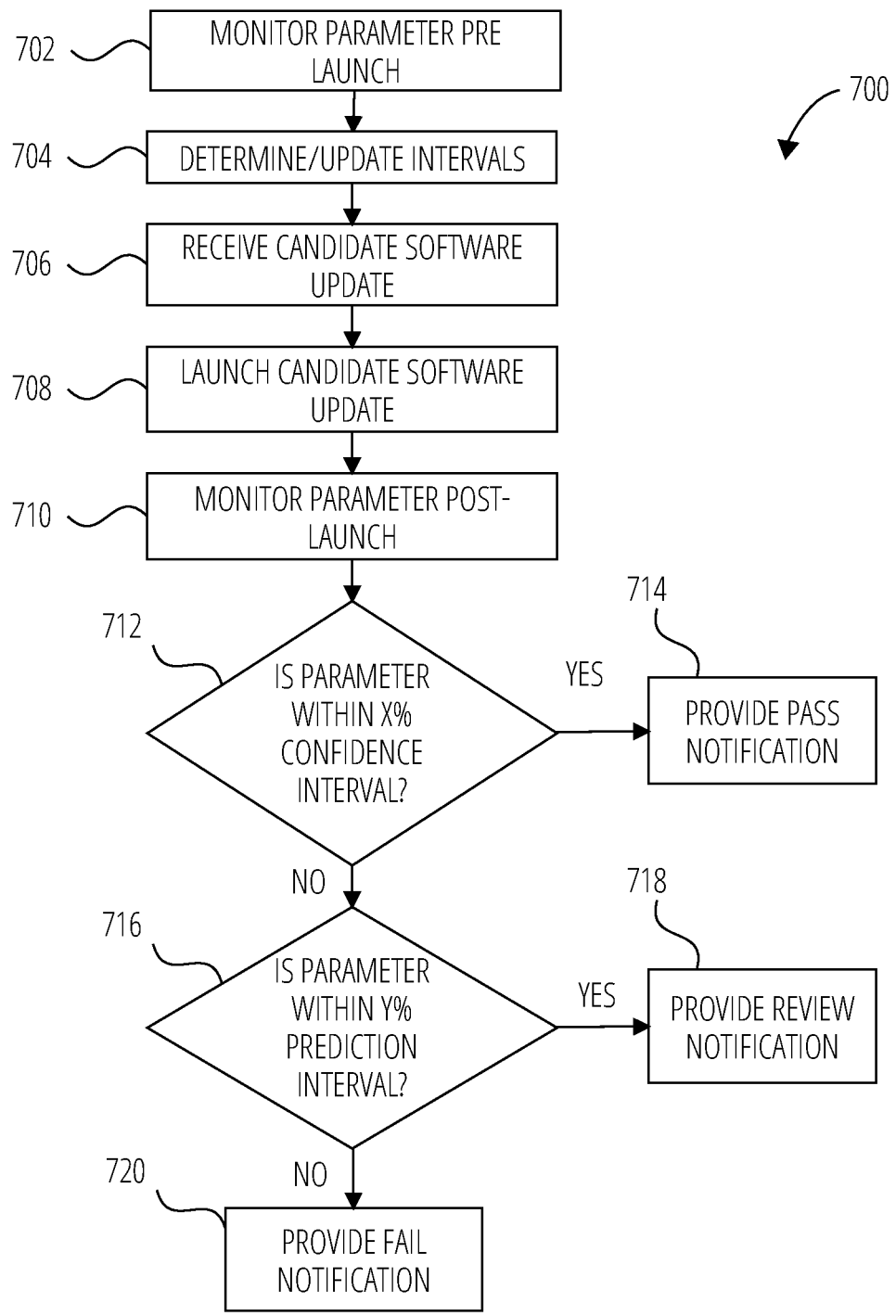
FIG. 7 is a flowchart 700 illustrating a regression testing method according to one example.

FIG. 7 is a flowchart 700 illustrating a regression testing method according to another example. For explanatory purposes, the operations of the flowchart 700 are described herein as occurring in serial, or linearly. However, multiple operations of the flowchart 700 may occur in parallel. In addition, the operations of the flowchart 700 need not be performed in the order shown and/or one or more blocks of the flowchart 700 need not be performed and/or can be replaced by other operations. Furthermore, while the operations in flowchart 700 are described with reference to application launch-support server 130, the associated functionality may alternative be provided as part of a separate software development or software release server system or separated between different servers or devices, including client devices 102.

The flowchart commences with the application launch-support server 130 monitoring one or more operational parameters pre-launch at operation 702. This monitoring may be of the relevant parameter(s) on all of the client devices 102 of current users of the messaging client 104 or only those of the intended recipients of the candidate update software if those can be specified in advance of the launch. Alternatively, the pre-launch parameters could be extracted after launch from the pre-launch data for the general population, once the client devices 102 that receive the candidate software update have been identified. The parameters could be user engagement parameters, system parameters or any other operational parameter that can be used to assess the functioning of the candidate update software itself, in the messaging system 100, or with other systems.

In operation 704, the confidence interval 410 and the prediction interval 412 are determined by the application launch-support server 130 from the pre-launch parameter data, as discussed above with reference to FIG. 3 and FIG. 4. The application launch-support server 130 then receives the candidate software from one or more developer/QA devices 110 in operation 706 and stores it in advance of launch of the update.

The application launch-support server 130 then launches the candidate software update in operation 708. In one example, the candidate software update is uploaded to an app store as an update to the messaging client 104 with the number of available downloads limited to a specific number of client devices 102. In another example, the candidate software update can be pushed to the desired number of client devices 102, which are preferably chosen randomly or semi-randomly, for example randomly (as far as practical) within a particular geographical area, time zone, operating system or other system or device parameter that may assist in eliminating a factor that could affect the relevant parameter(s) that is/are to be monitored for the regression testing.

The application launch-support server 130 then monitors the parameter(s) reflecting the user engagement with the updated messaging client 104 on the client device 102 in operation 710, and, if necessary, determines secondary parameters such as ratios and so forth that characterize the user experience, engagement or functioning of the updated messaging client as part of the messaging system 100.

Operation 702 and operation 704 may be based on a certain time. In one example, user engagement parameters may be monitored for three hours before launch of the update, the candidate software update may be provided to 800,000 client devices 102 (in a population of millions of users) and the engagement parameters may be monitored on the updated messaging client 104 for five hours after the update has been launched. These numbers may vary based on any number of considerations, such as the overall size of the user population and how active each user is on average.

At operation 712, at the end of the monitoring period, the application launch-support server 130 determines in operation 712 whether an observed parameter for the adopters of the candidate software update is within an X % (95% in one example) confidence interval. If it is, the application launch-support server 130 provides a corresponding notification in operation 714, for example to the developer/QA devices 110 or to a dashboard that the candidate software update has passed regression testing for this parameter. If it is not, the method proceeds to operation 716.

At operation 716, the application launch-support server 130 determines in whether the observed parameter for the adopters of the candidate software update is within an X % (95% in one example) prediction interval. If it is, the application launch-support server 130 provides a corresponding notification in operation 718, for example to the developer/QA devices 110 or to a dashboard interface, that the candidate software update and the observed parameters require review to determine whether or not the candidate software update is functioning correctly. In this case, the observed parameter is outside the confidence interval but still within the prediction interval.

If the application launch-support server 130 determines in operation 716 that the observed parameter for the adopters of the candidate software update is outside the X % (95% in one example) prediction interval, the application launch-support server 130 provides a notification in operation 720, for example to the developer/QA devices 110 or to a dashboard interface, that the candidate software update is not functioning correctly.

Machine Architecture

Figure 8:
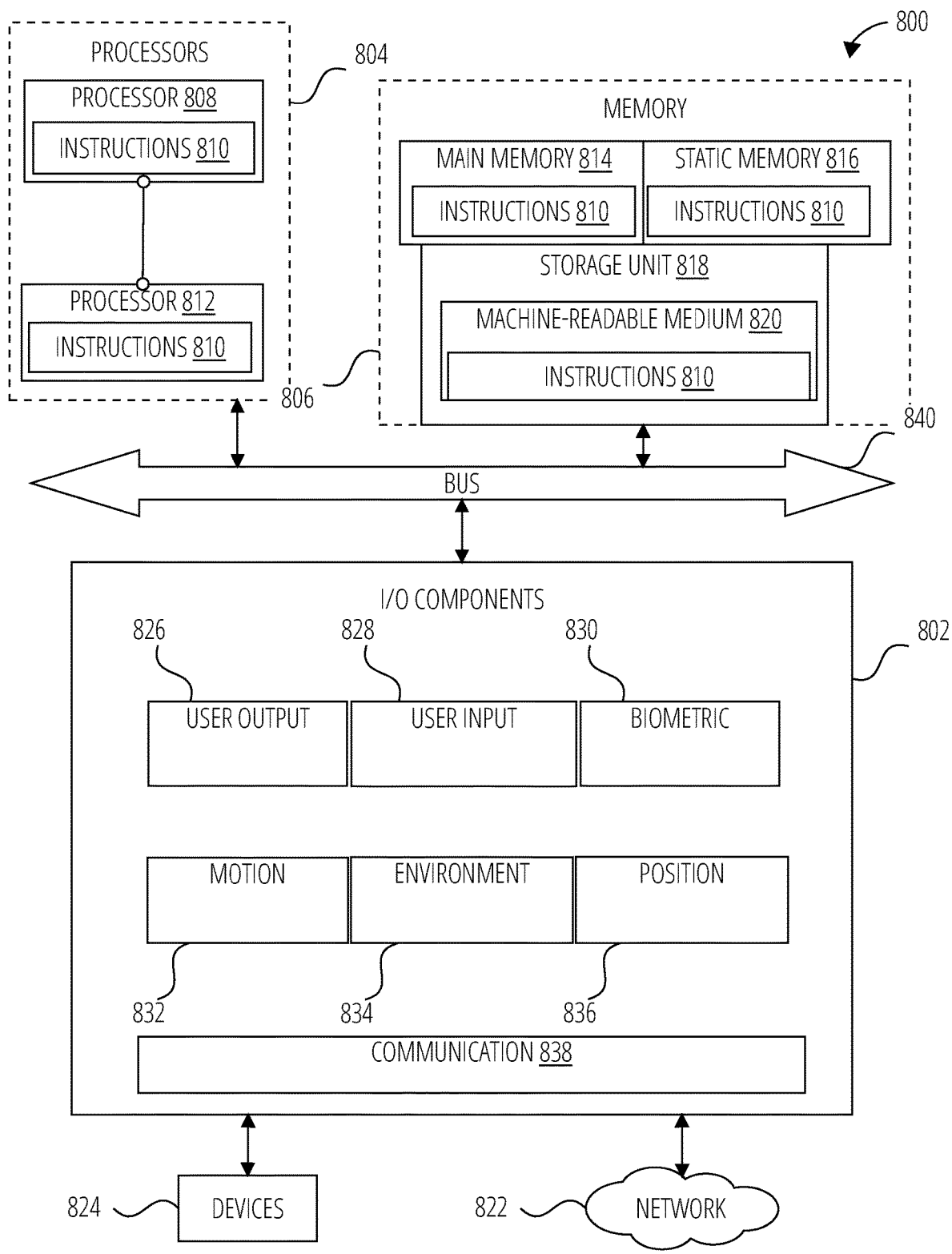
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the client device 102 or any one of a number of server devices forming part of the messaging server system 108. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
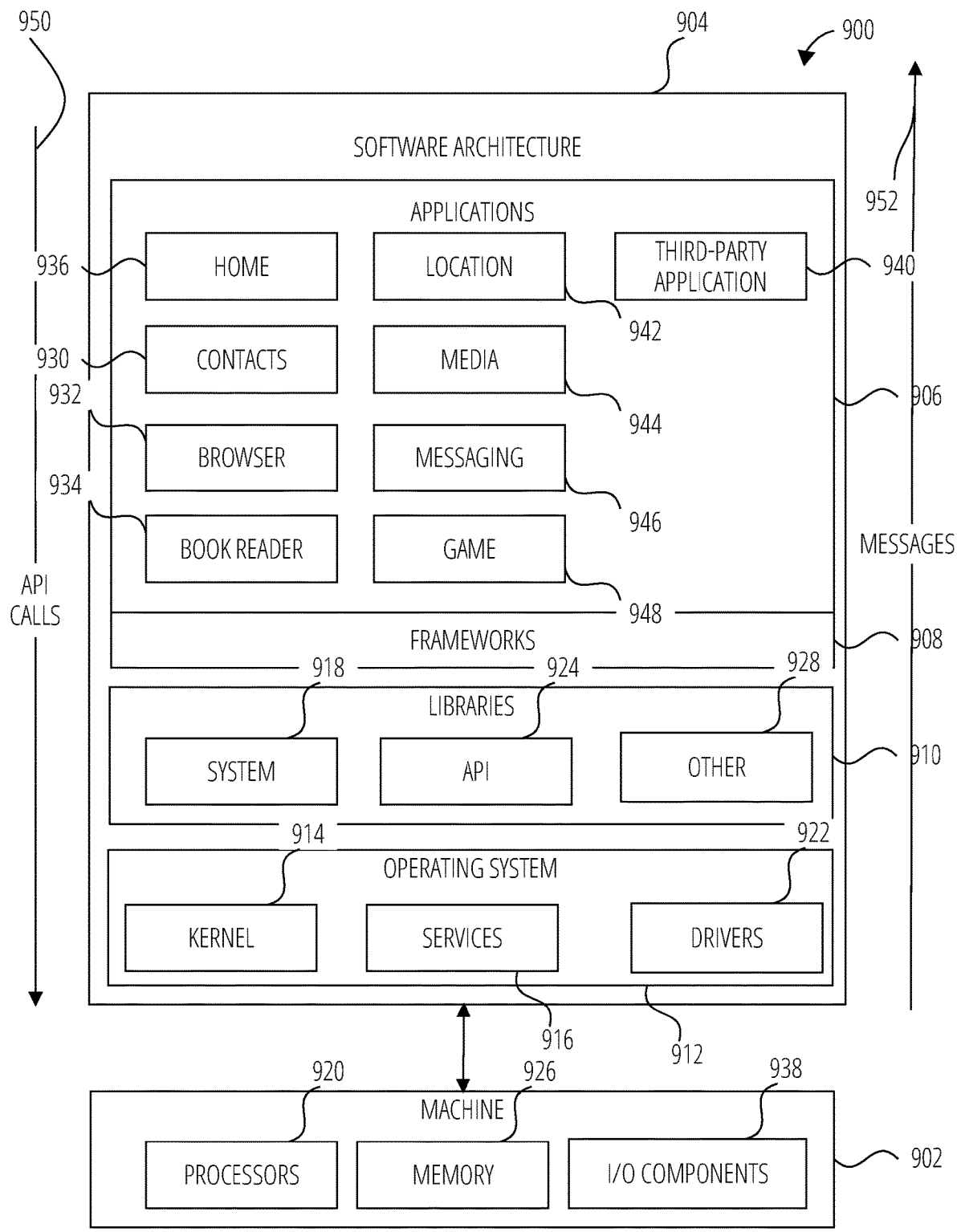
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of software launch regression testing, performed by one or more processors, comprising:
    determining previous values of an operational parameter of previous versions of an application from data received from a plurality of client devices running the previous versions of the application, wherein the operational parameter is a ratio of transmissions of content from the plurality of client devices to successful viewing of the content on recipient client devices;
    determining a current value of the operational parameter of an existing version of the application from data received from a plurality of client devices running the existing version of the application;
    determining a probability interval from the previous values and the current value of the operational parameter;
    launching a candidate update application to client devices comprising a subset of the plurality of client devices;
    determining a value of the operational parameter of the candidate update application using data received from the subset of the plurality of client devices running the candidate update application;
    determining if the value of the operational parameter of the candidate update application falls within the probability interval; and
    based on the value of the operational parameter of the candidate update application falling within the probability interval, providing a testing pass notification.

2. The method of claim 1, wherein a size of the probability interval depends on whether or not the operational parameter is a critical parameter.

3. The method of claim 1, wherein the probability interval comprises a confidence interval within which correct functioning of the candidate update application can be assumed, the method further comprising:
    determining a prediction interval from the previous values and the current value of the operational parameter, the prediction interval comprising an interval of values of the operational parameter within which the candidate update application may or may not be functioning correctly;
    determining if the value of the operational parameter of the candidate update application falls within the prediction interval; and
    based on the value of the operational parameter of the candidate update application falling outside the confidence interval but within the prediction interval, providing a testing review notification.

4. The method of claim 3, further comprising:
    based on the value of the operational parameter of the candidate update application falling outside the prediction interval, providing a testing fail notification.

5. The method of claim 1, wherein launching the candidate update application comprises:
    uploading the candidate update application to an app store,
    wherein a number of available downloads of the candidate update application from the app store is limited to a predetermined number.

6. The method of claim 1, wherein launching the candidate update application comprises:
    limiting launch of the candidate update application to client devices having a particular characteristic.

7. The method of claim 6, wherein the particular characteristic is location of the client devices within a particular geographical area or time zone.

8. A non-transitory computer-readable storage medium, the computer-readable storage medium including instructions that when executed by a computer, cause the computer to perform operations for software launch regression testing, comprising:
    determining previous values of an operational parameter of previous versions of an application from data received from a plurality of client devices running the previous versions of the application, wherein the operational parameter is a ratio of transmissions of content from the plurality of client devices to successful viewing of the content on recipient client devices;

determining a current value of the operational parameter of an existing version of the application from data received from a plurality of client devices running the existing version of the application;

determining a probability interval from the previous values and the current value of the operational parameter;

launching a candidate update application to client devices comprising a subset of the plurality of client devices;

determining a value of the operational parameter of the candidate update application using data received from the subset of the plurality of client devices running the candidate update application;

determining if the value of the operational parameter of the candidate update application falls within the probability interval; and based on the value of the operational parameter of the candidate update application falling within the probability interval, providing a testing pass notification.

9. The computer-readable storage medium of claim 8, wherein a size of the probability interval depends on whether or not the operational parameter is a critical parameter.

10. The computer-readable storage medium of claim 8, wherein the probability interval comprises a confidence interval within which correct functioning of the candidate update application can be assumed, wherein the instructions further configure the computer to perform operations further comprising:

determining a prediction interval from the previous values and the current value of the operational parameter, the prediction interval comprising an interval of values of the operational parameter within which the candidate update application may or may not be functioning correctly;

determining if the value of the operational parameter of the candidate update application falls within the prediction interval; and based on the value of the operational parameter of the candidate update application falling outside the confidence interval but within the prediction interval, providing a testing review notification.

11. The computer-readable storage medium of claim 10, wherein the instructions further configure the computer to perform operations further comprising:

based on the value of the operational parameter of the candidate update application falling outside the prediction interval, providing a testing fail notification.

12. The computer-readable storage medium of claim 8, wherein launching the candidate update application comprises:

uploading the candidate update application to an app store, wherein a number of available downloads of the candidate update application from the app store is limited to a predetermined number.

13. A computing apparatus comprising: a processor; and a memory storing instructions that, when executed by the processor, configure the apparatus to:

determine previous values of an operational parameter of previous versions of an application from data received from a plurality of client devices running the previous versions of the application, wherein the operational parameter is a ratio of transmissions of content from the plurality of client devices to successful viewing of the content on recipient client devices;

determine a current value of the operational parameter of an existing version of the application from data received from a plurality of client devices running the existing version of the application;

determine a probability interval from the previous values and the current value of the operational parameter;

launch a candidate update application to client devices comprising a subset of the plurality of client devices;

determine a value of the operational parameter of the candidate update application using data received from the subset of the plurality of client devices running the candidate update application;

determine if the value of the operational parameter of the candidate update application falls within the probability interval; and based on the value of the operational parameter of the candidate update application falling within the probability interval, provide a testing pass notification.

14. The computing apparatus of claim 13, wherein a size of the probability interval depends on whether or not the operational parameter is a critical parameter.

15. The computing apparatus of claim 13, wherein the probability interval comprises a confidence interval within which correct functioning of the candidate update application can be assumed, wherein the instructions further configure the apparatus to:

determine a prediction interval from the previous values and the current value of the operational parameter, the prediction interval comprising an interval of values of the operational parameter within which the candidate update application may or may not be functioning correctly;

determine if the value of the operational parameter of the candidate update application falls within the prediction interval; and based on the value of the operational parameter of the candidate update application falling outside the confidence interval but within the prediction interval, provide a testing review notification.

16. The computing apparatus of claim 15, wherein the instructions further configure the apparatus to:

based on the value of the operational parameter of the candidate update application falling outside the prediction interval, provide a testing fail notification.

17. The computing apparatus of claim 13, wherein launching of the candidate update application comprises:

uploading the candidate update application to an app store, wherein a number of available downloads of the candidate update application from the app store is limited to a predetermined number.

* * * * *